(No Model.)

B. BANNISTER.
TRUSS.

No. 354,034. Patented Dec. 7, 1886.

Witnesses.
John C. Perkins
Loring H. Bannister

Inventor:
Burr Bannister
By W. G. Button
Atty.

UNITED STATES PATENT OFFICE.

BURR BANNISTER, OF KALAMAZOO, MICHIGAN.

TRUSS.

SPECIFICATION forming part of Letters Patent No. 354,034, dated December 7, 1886.

Application filed August 6, 1886. Serial No. 210,234. (No model.)

*To all whom it may concern:*

Be it known that I, BURR BANNISTER, a citizen of the United States, residing at Kalamazoo, in the county of Kalamazoo and State of Michigan, have invented certain new and useful Improvements in Truss-Pads; and I do hereby declare the following to be a full, clear, and exact description of the invention, such as will enable others skilled in the art to make and use the said invention, reference being had to the accompanying drawings, and to the letters and figures of reference marked thereon, which form a part of this specification.

Figure 4:
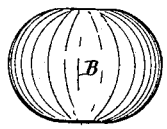
Figure 3:
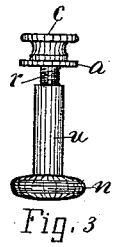
Figure 1:
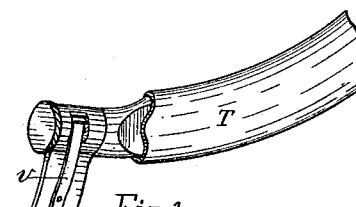
Figure 2:
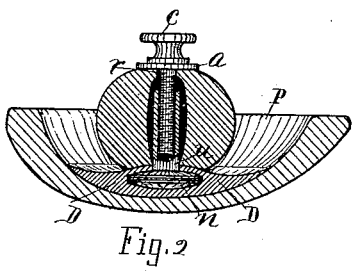

Figure 1 is a perspective view of a portion of the truss arm and pad, viewed from the outside. Fig. 2 is a sectional view of the pad, taken on the dotted line of Fig. 1. Fig. 3 is a view of the adjusting-screw removed from the pad. Fig. 4 is a side view of the rubber ball used in the pad.

My invention relates to improvements in truss-pads for the retention of hernia; and the object of my invention is to so secure the pad to the truss-band on an arm from the truss-band that it will adjust itself perfectly to any surface, (as the hernia-body.)

My invention consists in securing the pad to the rest of the truss by means of a compressible rubber ball provided with an adjusting-screw, the said screw passing through the band of the truss, or an arm attached to said band, and the said screw working in a nut which is secured to the inside of the pad.

In the drawings, T is the band of the truss; *a*, an arm provided with a spring, *v*, which acts as a pawl on the teeth of a ratchet cut upon the end of the band T; P, the pad, having a large oval opening in which the rubber ball B is placed, and can move in any direction.

D is a mass of rubber secured to the inside of the pad at the bottom, and having embedded in it the head *n* of the nut *u*, the body of which passes up through an opening slightly longer than itself in the rubber ball B. In the said nut *u* a screw, *r*, works, the screw having a milled head, C. The nut *u* may be more or less rigidly secured to the pad by using rubber of greater or less flexibility. This flexible connection between the screw and the pad permits the pad to conform to the body, in whatever position the body may take. By tightening the screw to its limit the rubber ball is compressed, and the pad then exerts the least pressure upon the hernia. By releasing the screw it exerts the greatest pressure, the pad moving to the body.

In any case of hernia difficult to retain or keep in place larger diameters of balls and greater density in the quality of rubber composing the balls may be used, whereby any pressure needed in any case may be obtained to hold the most difficult hernia.

With non-elastic pads, the pad by leverage will force the spring worn round the body of the patient from its position, or the spring may, if a rigid one, force the pad from its place. This is a practical fault which I have found with all hard pads, and which I overcome fully by the above-described devices, as any effect of leverage from the spring-pad or pad-arm is destroyed or overcome by the flexible rubber holding the screw and pad.

Where wooden pads, or pads other than hard rubber, are to be used with this device, it will be necessary to experiment to adopt the best method of securing the sheet-rubber in which the nut is embedded to the pad.

When the pad is made of hard rubber, I vulcanize the soft rubber in place, and when made of other material the nut of the screw can be secured to the rubber by vulcanizing the latter.

The rubber ball and screw are also useful as a means of adjustment of the pad to the hernia for position as well as pressure, for by releasing the screw the pad moves to the hernia, and by tightening the screw the pad is lifted from the hernia.

Having now fully described my invention, what I claim, and desire to secure by Letters Patent, is—

The above-described truss-pad, which consists of a concave pad provided with an elastic connecting material, in combination with an elastic ball connected to said elastic material by an adjustable compressing-screw which passes through said ball and is embedded in said elastic material, as herein described, and for the purposes specified.

In witness whereof I have hereunto set my hand.

BURR BANNISTER.

Witnesses:
MELVILLE J. BIGELOW,
T. T. GIDDINGS.